United States Patent [19]

Schneider

[11] 3,860,812
[45] Jan. 14, 1975

[54] DIFFUSING SCREEN FOR PHOTOGRAPHIC LIGHTING

[75] Inventor: Arthur Schneider, Volkenrode, Germany

[73] Assignee: Rollei-Werke Franke & Heidecke, Braunschweig, Germany

[22] Filed: Oct. 9, 1973

[21] Appl. No.: 404,717

[30] Foreign Application Priority Data
Oct. 7, 1972   Germany............................ 2249241

[52] U.S. Cl............. 240/46.03, 240/1.3, 240/106.1, 354/126
[51] Int. Cl............................................. F21v 11/18
[58] Field of Search.............. 240/46.03, 106, 106.1, 240/1.3, 20; 354/126, 149

[56] References Cited
UNITED STATES PATENTS

| | | | |
|---|---|---|---|
| 2,129,154 | 9/1938 | Sherman | 240/1.3 |
| 2,789,205 | 4/1957 | Schwartz et al. | 240/1.3 |
| 2,848,601 | 8/1958 | Beach | 240/106.1 |
| 2,877,342 | 3/1959 | Beach | 240/106.1 |
| 3,172,345 | 3/1965 | Jakob et al. | 354/126 |
| 3,386,360 | 6/1968 | Nerwin | 240/1.3 |
| 3,404,612 | 10/1968 | Harvey | 354/149 |
| 3,484,599 | 12/1969 | Little | 240/106 R |

*Primary Examiner*—Richard L. Moses
*Attorney, Agent, or Firm*—Stonebraker & Shepard

[57]   ABSTRACT

An adjustable diffusing screen to be mounted in front of an illumination source such as an electronic flash tube, or a flash bulb. The screen has two superimposed layers of transparent material with grooves formed in each layer, one layer being movable laterally with respect to the other. When the grooves of one layer are in a certain position relative to the grooves of the other layer, the screen provides minimum diffusion of the light source, sufficient to illuminate a normal field of view of the associated camera, such as the field of view when using a normal or standard lens. When the grooves in one layer of the screen are moved to a different position relative to the grooves in the other layer, the screen provides diffusion of the light source over a greater area, to illuminate a wider field of view of the camera, such as obtained when using a wide angle lens on the camera.

7 Claims, 3 Drawing Figures

DIFFUSING SCREEN FOR PHOTOGRAPHIC LIGHTING

BACKGROUND OF THE INVENTION

A flash light unit for photographic purposes customarily has a source of light (such as an electronic flash tube, or a replaceable flash bulb) with a reflector behind it. It is customary to place a light diffusing screen in front of the light source, covering the area defined by the size of the reflector, this diffusing screen serving to diffuse the light emitted from the flash unit and distrubute it as uniformly as possible over the entire plane surface or area to be photographed. Such diffusing screens are furnished with a light diffusing surface which can be of various designs.

When the camera with which the flash unit is used is equipped with a "normal" lens (say for example a lens having a focal length of about 50 millimeters, for a camera using ordinary 35mm film) the camera will have an angular field of view of somewhere around 40°–45°. But if the camera is equipped with a "wide angle" lens, having a focal length of around 38mm, then the angular field of view of the camera is greater, being for example about 60°–65°.

Previously it has been customary to equip the flash light unit with a diffusing screen so designed as to give a sufficiently great lateral zone of dispersion to illuminate the wider field of view, thus permitting flash photographs to be taken when using a wide angle lens on the camera. However, when taking a flash photograph with a standard or normal lens most frequently used, a non inconsiderable amount of light remains laterally unused, and is lost for practical purposes, simply illuminating objects which are laterally beyond the field of view of the camera with the standard or normal lens. The flash unit would be more effective and efficient if the available output of light could be confined more closely to the actual field of view of the camera, instead of being wasted beyond the edges of the field of view.

It has been suggested to make the light diffusing screen interchangeable, so that when using the flash apparatus with a camera having a narrower field of view, one can use a diffusing screen which concentrates the light to the appropriate field of view, and when using the flash apparatus with a camera having a wider field of view, a different screen can be used, constructed to diffuse the light over the desired wider field. But this is not a satisfactory solution of the problem, because the changing of the screen is troublesome and time consuming, and furthermore it demands that when one screen is removed and replaced by another, the removed screen must be stored safely in a protective manner, so that it will not become broken or lost.

The present invention solves the problem by providing an adjustable light diffusing screen for flash light units, which can be adjusted to concentrate the light on a narrower field of view when taking a photograph with a normal or standard lens, or to diffuse the light over a wider field of view when taking a picture with a camera having a wide angle lens. By having a single adjustable screen, there are no loose parts which are liable to be misplaced or damaged, as in the case of interchangeable screens, and the screen can be adjusted from wide diffusing position to narrow diffusing position, or vice versa, very quickly and in a small fraction of the time required to take off an interchangeable screen and replace it with another.

An object of the invention is to provide such an adjustable diffusing screen, as above outlined, in a practical and ecomomical form, easy to use, and effective to produce the desired light control.

DESCRIPTION OF THE PREFERRED EMBODIMENT

In the preferred embodiment of the present invention, the light diffusion screen is divided into two screens with uneven top surface structure lying one against the other. By means of the displacement of one screen element relative to the stationary second screen element, the jointly produced diffusing effect of the flash unit in changed.

The change occurs in a restricted area, chiefly between the relative position, preferably corresponding to the diffusion appropriate for a normal focal length lens, where there is no noticeable deflection by merely roughly the direct passage of light through the diffusing screen, and the other position in which the emitted light is more diffused and covers a wider angular range. In the first position mentioned, for illuminating the area of the field of view of a normal or standard lens, the effects of the unevenness of the screen surfaces lying one upon the other almost cancel each other out.

Advantageously the above mentioned unevenness of both of the screen layers or parts is formed on the inner surfaces of the respective parts, facing each other. The result is that optically these unevennesses can easily complement one another, add to each other, or subtract from each other. It is particularly advantageous to provide the two diffusing screen parts or layers which lie one above the other, with a prismatic structure, and preferably each layer has a prismatic structure in the opposite direction from that of the other layer. Preferably also they are formed in such a way that they can be pushed in a superimposed state, in a direction parallel to each other. In other words, one screen part may be stationary, and the other screen part may slide on the stationary part while in contact therewith.

Within the scope of the invention, this prismatic structure can have a wedge shape construction, and can be made by a construction method similar to the known Fresnel lenses, from which they can be differentiated, however. It is usually preferred to have the prismatic or other uneven structure of the surfaces extend over substantially the entire area of the screen. On the other hand it is also possible to have the prismatic or other uneven structure merely on part of the area of the screen, such as the middle part.

Figure 1:
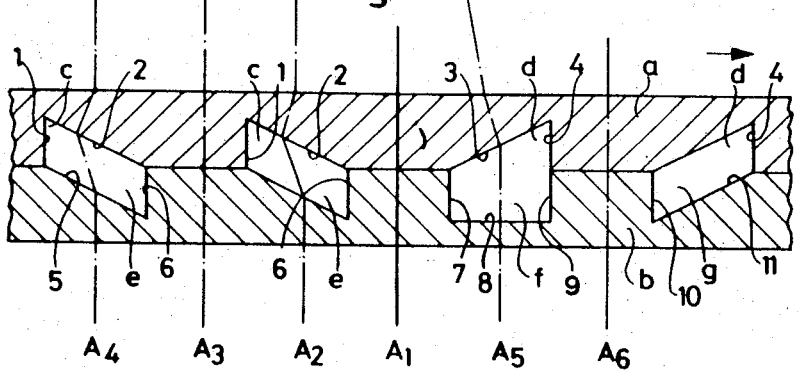
FIG. 1 is a cross sectional view, greatly enlarged, through a fragment of a screen structure according to a preferred embodiment of the invention, showing the two parts of the screen adjusted to the position for taking a picture with a normal or standard lens.
Figure 2:
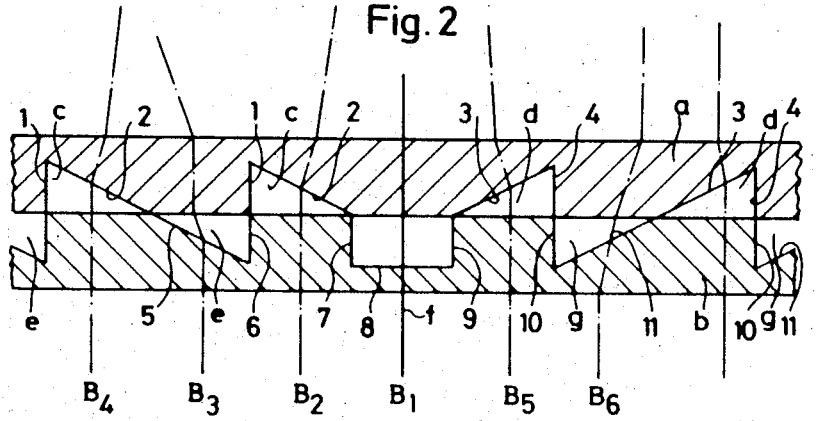
FIG. 2 is a similar view showing the screen parts adjusted to provide a wider angle of illumination, for taking a photograph with a wide angle lens.

Lying one above the other as they do, the two diffusing screen parts or units are always thin in form and the prismatic structure must be very fine. As a result, the range of displacement of one screen part relative to the other is very small. The size of the prismatic grooves illustrated in FIGS. 1 and 2 is greatly enlarged for the sake of clarity of illustration. The placing of the grooves or other irregularities on the inner faces of the two screen parts, facing each other, protects them against damage from accidental external contact, and also keeps dust and dirt out of the grooves or other uneven configuration.

It is also possible to provide a type of guide bar bracket for the operation of moving one layer slightly relative to the other layer, to obtain the desired change in the angle of diffusion. In the preferred form, the manual adjusting operation takes place vertically, but produces a horizontal effective adjustment movement.

In FIGS. 1 and 2, the two thin diffusing screens (or the two parts of one screen, if the two layers together are considered collectively as constituting a single screen) are designated by the reference characters $a$ and $b$. They are illustrated in enlarged horizontal section, one being stationary, and the other being movable horizontally relative to the first. In the illustration, the layer $a$ is stationary and the layer $b$ moves horizontally (right or left in the drawings) relative to layer $a$, but it does not matter which one is stationary and which one moves.

Each of these layers has prismatic or wedge shaped slots. The top layer $a$ has prismatic slots $c$ to the left of the center line, each of the slots having its point directed upward and to the left as illustrated, and having boundary planes 1 and 2, and also has another series of slots $d$ to the right of the center line, with their points directed upward to the right, with boundary planes 3 and 4.

The lower screen layer or part $b$ has slots arranged in reverse directions relative to those of the other layer. The layer $b$ has, to the left of the center line, a series of prismatic slots $e$, with their points directed downwardly and to the right, formed by inclined planes 5 and vertical planes 6. To the right of the center line, the layer $b$ has a series of prismatic slots $g$ with points directed downward to the left, and formed with vertical boundary planes 10 and inclined boundary planes 11. In addition, between the left hand series of slots $e$ and the right hand series of slots $g$, there is a rectangular slot $f$ formed with two vertical boundary planes 7 and 9, and a horizontal plane 8. It will be noted from the drawing that the horizontal spacing of the slots in the two layers $a$ and $b$ is the same, so that in one position as shown in FIG. 1 the slots of the two layers come exactly opposite each other as illustrated, and when fully moved to the other extreme position, the slots of one layer are completely offset from the slots of the other layer.

In the relative position shown in FIG. 1, which is the position for diffusing light to the normal field of view or area covered by a normal or standard lens, the two screen parts $a$ and $b$ lie on top of each other in such a way that they have almost parallel diffusing surfaces, and they transmit the light without any special unusually enlarged area of lateral dispersion. This is seen by examining the schematic light beams which have been drawn at $A_1$, $A_2$, $A_3$, etc. This is one limit of the action of the diffusing screen in accordance with the invention.

The other limit, with maximum dispersion or diffusion of the light, as illustrated in FIG. 2. Here the screen layer $b$ has been moved one space toward the left, as compared with FIG. 1. The slots $e$, $f$, and $g$ of the screen layer $b$ are now opposite the spaces between the slots $c$ and $d$ of the first layer $a$. The light is here refracted at the transition from the transparent material (glass or plastic) from which the screen is made, to the air of the slot, and again on the transition from the air of the slot to the transparent material. As a result of this position of the surfaces, the light is diffused or dispersed by the refraction, as shown by the digrammatic light rays illustrated at $B_1$, $B_2$, $B_3$, etc., so that the light, after emerging from the screen, covers a wider angular area sufficiently illuminates the wider field of view when photographing with a wide angle lens.

It is to be borne in mind that a refracting surface along the lines of a Fresnel lens does not result from the displacement of the two layers of the screen relative to each other, according to the present invention. On the contrary, the wedge surfaces following one after the other diffract the light once to the left and once to the right, so that there is no diffraction divergence effect as with a negative lens, but a diffusion effect in the true sense of the underlying specification given here.

In order to effect the desired displacement of one screen layer relative to the other, and at the same time to limit the displacement to the desired amount, it is advantageous to select, as the distance between successive slots, the width of the slots themselves. The slots can extend in directions parallel to each other, each in a straight line, or they can be formed as rings. When the slots are parallel, the diffusing effect occurs in one plane, for example in the horizontal plane when the slots are vertical. If the slots are formed as circular rings, then the greatest diffusion effect occurs in the horizontal plane (assuming that one layer moves horizontally relative to the other) and the diffusion effect decreases at a steady rate around the circle until the vertical is reached, where the diffusion is at a minimum.

Using the present invention as proposed here, that is, as an ancillary screen for photographic flash units, there is optically only limited magnification or expansion of the light angle, only in one plane, either in the horizontal or in the vertical, depending on the direction of the prismatic slots. However, the lateral diffusing effect is achieved in a most advanced and satisfactory way.

Some of the features of the preferred forms of the invention may be briefly summarized as follows. First, the diffusing screen has parallel slots with similar wedge angles in both of the plates or layers, the wedge angles being in opposite directions to the right and to the left of the center. Because the wedge angles are the same in the adjacent slots of the two layers, it follows that the inclined surface of one slot is parallel to the inclined surface of the companion slot in the other layer; that is, the inclined surface 2 of the slot $c$ of layer or plate $a$ is parallel to the inclined surface 5 of the companion slot $e$ in the other layer or plate $b$, and the inclined surface 3 of the slot $d$ is parallel to the inclined surface 11 of the companion slot $g$. The same applies to ring shaped or concentric slots, when considered in radial cross section.

Second, the diffusing screen may be said to consist of a pair of plates or layers whose opposite surfaces have wedge shaped parallel slots or concentric ring shape slots, in either case the opposite wedge surfaces of one plate being parallel to those of the companion slots in the other plate, and the distances between slots being equal to the width of the slots.

The adjustable diffusing screens of the present invention can be used not only as original parts of newly constructed flash units, but also as replacement screens for existing flash units already available. If a screen of the present invention is used to replace an original screen which was designed to illuminate a wide area in order to permit photography with a wide angle lens, then the screen of the present invention, when adjusted to its narrower diffusing position, will result in increasing the central brightness of the light output, thereby increasing the photographic guide member of the flash unit for normal photography with a standard lens.

Figure 3:
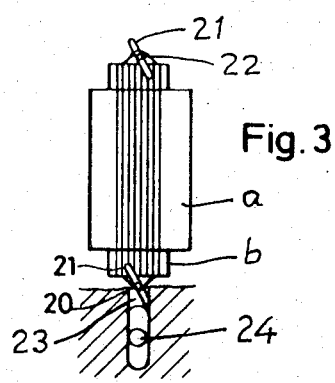
FIG. 3 is a schematic view of a guide bar bracket arrangement for shifting the screen parts for one position to the other.

FIG. 3 illustrates schematically a preferred arrangement for adjusting the position of one screen layer or plate relative to the other. The front plate or layer is shown at *a* and the rear plate or layer at *b*. The supporting structure or bracket is shown at 20. Extensions at top and bottom of the rear layer *b* of the screen have inclined slots 21, which receive pins 22 on a vertically extending guide bar or operating bar 23 provided with an accessible handle or knob 24 by which the bar may be moved vertically. Vertical movement of the bar will cause the pins 22 to act on the slots 21 to move the screen layer *b* horizontally. The angle of the slots 21 relative to the direction of movement of the guide bar 23 is rather small, so that the screen layer or plate is moved laterally only to a very small extent (the extent of spacing of the grooves from each other) whereas the bar 23 and handle 24 move to a considerably greater extent, enabling the operator to be sure, from the sense of feeling, that he has accomplished the desired movement.

What is claimed is:

1. A light diffusing screen adapted to extend across the front of a photographic lighting unit to control the diffusion of light from such unit onto a field to be photographed, said screen comprising means for varying the lateral spread of light passing through said screen, said screen having two layers of transparent material lying one on top of the other, one layer being slidable parallel to the surface of the other, each layer having an uneven surface structure on the surface thereof which faces the other layer with the uneven surfaces of the two layers substantially in contact with each other, the uneven surface structures of at least one of the layers comprising a prismatic structure having a plurality of slots having substantially the same wedge angles, the wedge angles of the slots on one side of the approximate center of the screen being in the opposite direction from those on the other side of said center.

2. A screen as defined in claim 1, wherein at least part of the surface of the other layer has a prismatic structure similar to that of the first layer, and the wedge angles of the second layer are substantially parallel to those of the first layer.

3. A screen as defined in claim 2, wherein the widths of the prismatic slots and the spaces between adjacent slots are substantially the same in both layers, so that in one adjusted position of the two layers relative to each other, the slots of one layer will be directly opposite the slots of the other layer, and in another adjusted position the slots of one layer will be directly the spaces between the slots of the other layer.

4. A screen as defined in claim 2, wherein the distance between adjacent slots on each layer is substantially equal to the width of the slots.

5. A screen as defined in claim 1, wherein the slots are parallel and run in straight lines.

6. A screen as defined in claim 1, wherein said slots are only in the central part of the lateral width of the screen.

7. A screen as defined in claim 1, wherein the slots are arranged in a concentric ring shaped pattern.

* * * * *